United States Patent [19]
Tolsdorf

[11] Patent Number: 5,228,607
[45] Date of Patent: Jul. 20, 1993

[54] RACK MOUNTABLE ON A TRAILER HITCH BALL

[75] Inventor: Geoffrey G. Tolsdorf, Barrington, R.I.

[73] Assignee: TVP, Inc., Barrington, R.I.

[21] Appl. No.: 712,073

[22] Filed: Jun. 7, 1991

[51] Int. Cl.$^5$ .............................................. B60R 9/00
[52] U.S. Cl. ........................... 224/42.03 B; 224/273; 224/42.45 R; 269/97
[58] Field of Search .............. 224/42.03 R, 42.03 A, 224/42.03 B, 42.06, 42.45 R, 273; 269/97, 201, 203, 228; 280/415.1, 512

[56] References Cited

U.S. PATENT DOCUMENTS

| | | | |
|---|---|---|---|
| 2,874,976 | 2/1959 | Linn | 280/512 |
| 3,049,366 | 8/1962 | Peters | 280/512 |
| 3,210,103 | 10/1965 | Montgomery | 403/115 |
| 3,794,227 | 2/1974 | Stearns | 224/42.03 B |
| 3,858,775 | 1/1975 | Haas | 224/42.03 B |
| 3,876,123 | 4/1975 | Stuntz | 224/42.03 B |
| 4,299,341 | 11/1981 | Copeland | 224/42.03 B |
| 4,856,686 | 8/1989 | Workentine | 224/42.03 B X |

FOREIGN PATENT DOCUMENTS

| | | |
|---|---|---|
| 159716 | 5/1957 | Denmark . |
| 148531B | 2/1984 | Denmark . |
| 900099 | 4/1990 | PCT Int'l Appl. . |

Primary Examiner—Henry J. Recla
Assistant Examiner—Glenn T. Barrett
Attorney, Agent, or Firm—Hayes & Reinsmith

[57] ABSTRACT

A carrier rack includes a trailer-hitch ball-engaging mount selectively movable by articulated linkage between a released position and an operative position engagable with a trailer-hitch ball. In the operative position of the ball-engaging mount, an adjustable clamp selectively increases compressive forces of the mount on the ball to a desired loading. The linkage is configured and dimensioned to ensure that it is in a relaxed condition when the ball-engaging mount is in its operative position and subjected to the increased compressive forces applied by the adjustable clamp.

12 Claims, 4 Drawing Sheets

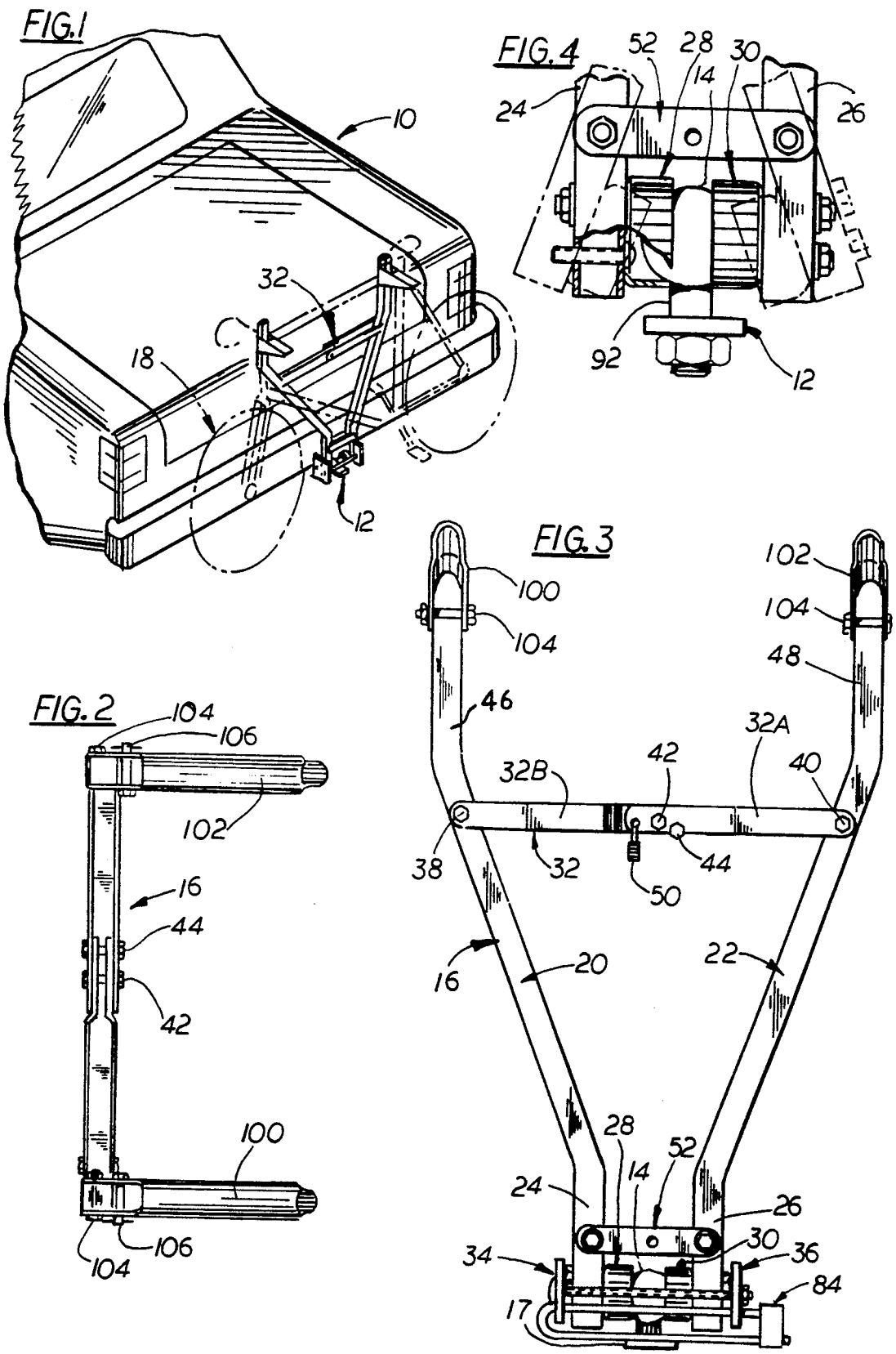

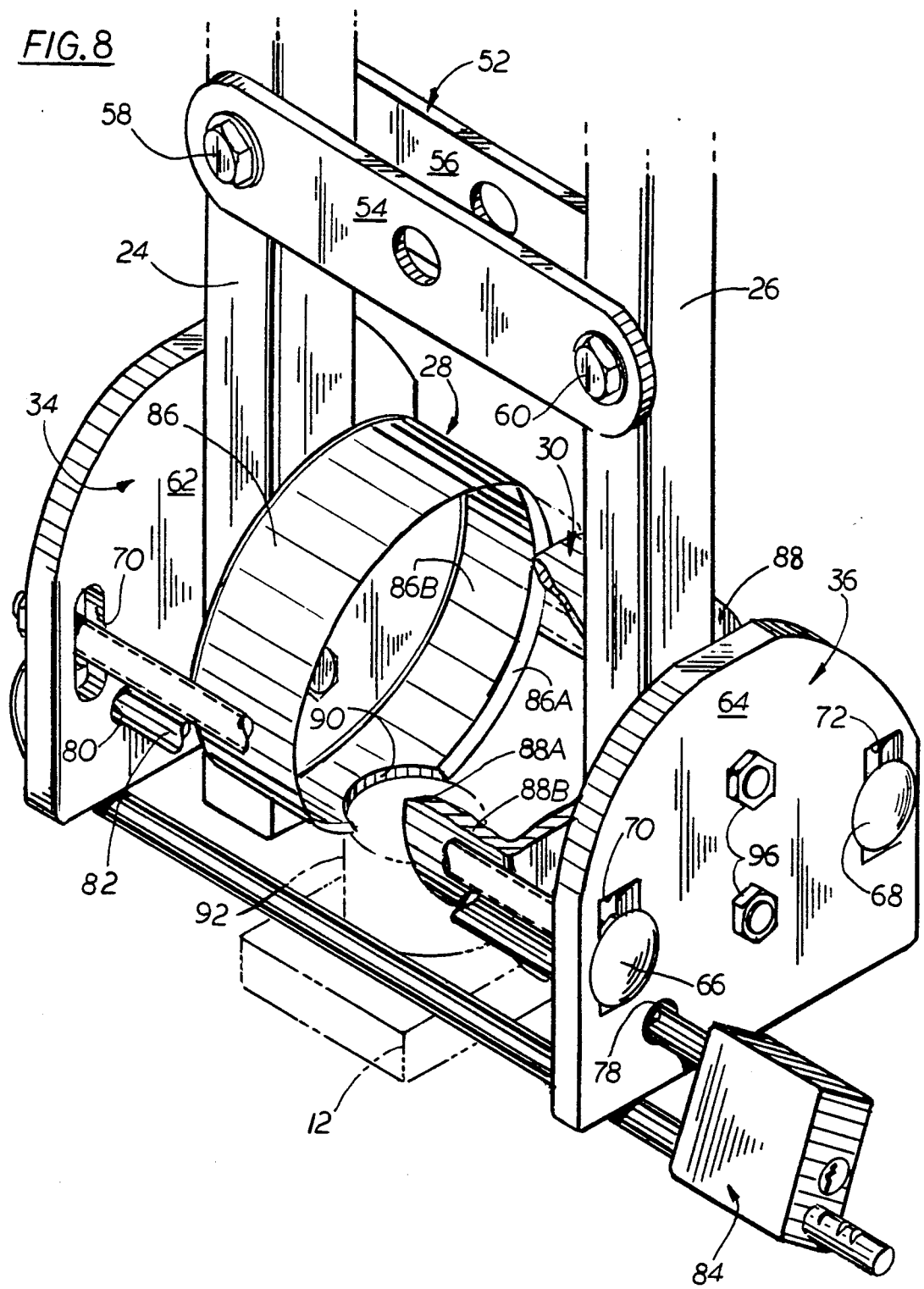

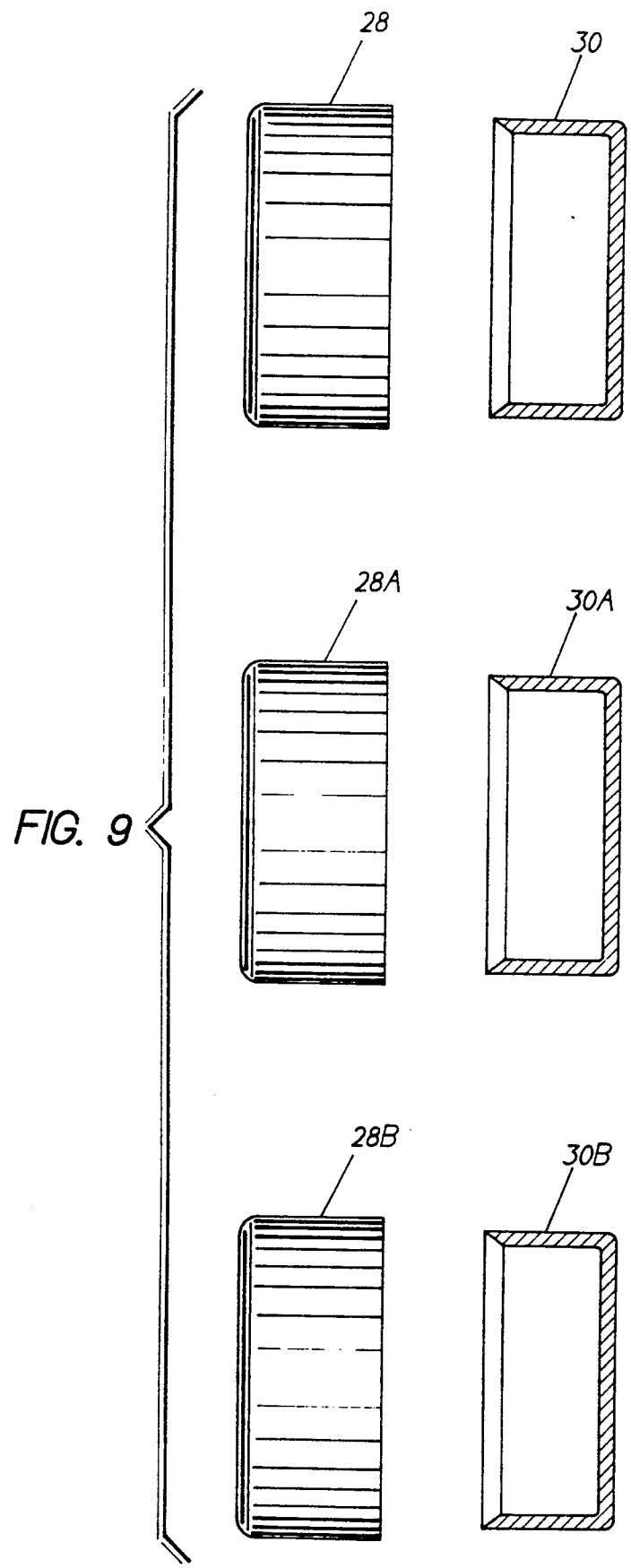

RACK MOUNTABLE ON A TRAILER HITCH BALL

FIELD OF THE INVENTION

This invention generally relates to carrier racks to be mounted on vehicles and particularly concerns a carrier rack mountable on a trailer-hitch ball.

BACKGROUND OF THE INVENTION

A variety of carrier racks have been utilized in the past for transporting articles such as bicycles, skis, suitcases, wheelchairs, strollers and similar objects, but there yet remains a need for a rack that exemplifies simplicity in its construction as well as being quick and easy to install for transporting a unit to be carried by the rack, and to disassemble in a safe and secure fashion.

OBJECTS OF THE INVENTION

Accordingly, a primary object of this invention is to provide a new and improved trailer-hitch ball mountable carrier rack which is not only quick and easy to install but provides a secure mount for an object to be transported by the vehicle and which is designed for injury-free usage.

Another object of this invention is to provide such a rack which is readily suitable for low cost manufacture and exhibits reliability under demanding conditions over extended periods of use.

A further object of this invention is provide such a rack which provides significantly improved security in the mounting of the rack on a trailer-hitch ball and features improved bearing surface engagement with the ball in an intentionally simplified design particularly suited to be secured against theft.

Other objects will be in part obvious and in part pointed out in more detail hereinafter.

SUMMARY OF THE INVENTION

The carrier rack of this invention is mountable on a trailer-hitch ball and includes a cup on each of a pair of arms wherein the cups feature beveled rims in confronting opposed relation to one another for enhanced surface-to-surface engagement with the ball. The cups are movable between a released position and an operative position in response to movement of the arms as controlled by linkage which includes a cross-piece articulated for movement between a collapsed position, wherein the cups are in released position and separated to ensure ball clearance, and an interlocking position wherein the cups are in an operative ball-engaged position in readiness to lock the rack on the ball. Adjustable clamp means are provided for applying a selectively increased clamping force on the cups in said operative position for locking the rack on the ball, and the linkage is dimensioned and configured to ensure that the cross-piece in its interlocking position is in a relaxed condition to ensure injury-free installation and disassembly.

BRIEF DESCRIPTION OF THE DRAWINGS

FIG. 1 is a perspective view of a vehicle having a carrier rack of this invention mounted on a trailer-hitch ball fixed to the vehicle;

FIG. 2 is a top view of the rack showing its cross-piece in interlocking position;

FIG. 3 is a front view of the rack of FIG. 2 showing the cross-piece in interlocking position and a ball-engaging means of the rack in an operative position;

FIG. 4 is an enlarged front view, partly in section and partly broken away, illustrating the ball-engaging means in operative position in full lines and in released position in broken lines;

FIG. 8 is a perspective view, partly in section and partly broken away, shown on an enlarged scale, illustrating details of the ball-engaging means and clamp means of this; and FIG. 9 is a side view, partly in section, showing three different ball-engaging cups for use in this invention with different size trailer-hitch balls.

Figure 5:
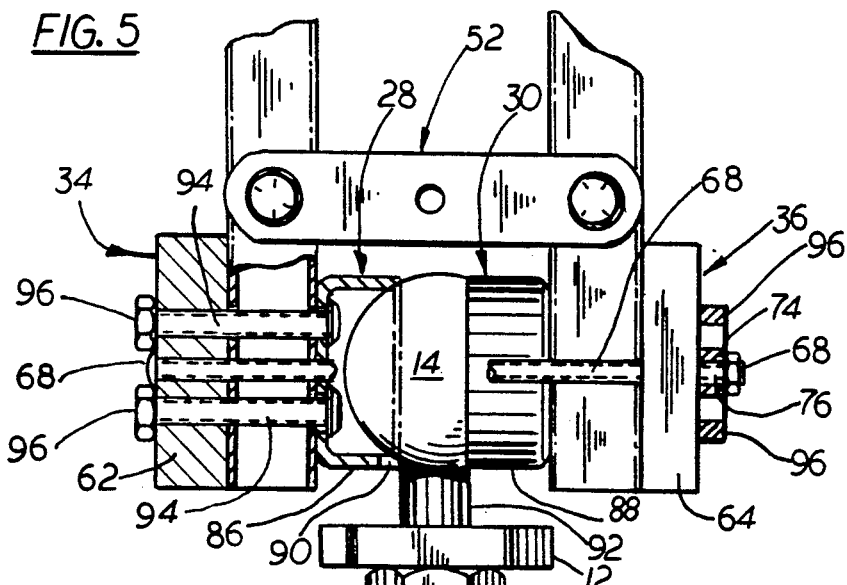
FIG. 5 is a yet further enlarged front view, partly in section and partly broken away, similar to FIG. 4 and showing the ball-engaging means in operative position and adjustable clamp means of this invention for exerting an increased compressive force on the ball-engaging means for locking the rack on the ball.

A better understanding of the objects, advantages, features, properties and relations of the invention will be obtained from the following detailed description and accompanying drawings which set forth an illustrative embodiment and are indicative of the various ways in which the principles of the invention are employed.

DESCRIPTION OF A PREFERRED EMBODIMENT OF THE INVENTION

In FIG. 1 a vehicle 10 is illustrated having a hitch plate 12 attached in a usual fashion to the vehicle 10. A ball 14 is affixed to plate 12. Such hitches typically are Class I and Class II hitches which conventionally feature 1 7/8 inch and 2 inch diameter balls; a less popular Class III hitch has a 2 1/4 inch diameter ball. Ball shank sizes vary conventionally between 3/4 inch and 1 inch shank diameters.

A carrier rack 16 of this invention is intended for attachment directly to a trailer-hitch ball such as at 14 for use in transporting a variety of different objects, and it is contemplated that the rack itself may be readily modified or converted for the transportation of strollers, skis, wheelchairs, suitcases and other items. In the specifically illustrated embodiment, the rack 16 is shown for use in transporting a bicycle (illustrated in broken lines at 18 in FIG. 1).

To provide a rack of significantly simplified construction for quick and easy installation and featuring a design wherein neither the rack nor the object being transported touches the body of the vehicle, a pair of rugged arms 20, 22 preferably formed of steel in the shape of hollow tubing of square cross-section are illustrated (as seen in FIG. 3) which are in mirror-image relationship with opposite ends of each arm reversely offset and in generally parallel relationship. One end 24, 26 of each arm 20, 22 has a ball-engaging means 28, 30 which is selectively clamped and released in response to movements of a cross-piece 32 and is secured in its operative position by adjustable clamp means 34, 36 cooperating with the arms 20, 22 and the ball-engaging means 28, 30 for selectively applying increased clamping forces thereon.

More specifically, the cross-piece 32 is a foldable unit articulated for movement between a collapsed position and an interlocking position. Opposite ends of cross-piece 32 are pivotally mounted to the arms 20, 22 by any suitable connecting means such as the illustrated fasteners 38, 40. The cross-piece 32 itself may be formed as a pair of matching hinged plates on opposite sides of the arms 20, 22 which are pivotally interconnected such as by fastener 42. In the specifically illustrated embodiment, a second fastener shown at 44 (FIGS. 2 and 3) extends through aligned openings, not shown, in opposing plates of hinged portion 32A and serves as a stop upon the shank of fastener 44 being engaged by hinged portion 32B which will be understood to have a relieved cutout permitting the cross-piece 32 to assume an aligned, extended interlocking position (FIGS. 2 and 3) wherein the ball-engaging means 28, 30 of the arms 20, 22 are adjacent to one another in operative position for engaging the trailer-hitch ball 14 and wherein opposite ends 46, 48 of each of the arms are remotely spaced apart.

It is to be understood that, if desired, a releasable locking means such as padlock 50 or the like may be provided for securing the cross-piece 32 in its interlocking position with the ball-engaging means 28, 30 in operative position.

To establish the required linkage for assisting the above-described arm movement, one end 24, 26 of each arm 20, 22 carrying the ball-engaging means 28, 30 is reversely offset relative to the opposed offset ends 46, 48 of the arm above cross-piece 32. Offset ends 24, 26 are provided with a cross-link 52 comprising a matching pair of plates 54, 56 (FIG. 8) on opposite sides of the arms 20, 22 having a pivot pin connection to each arm 20, 22 established by fasteners 58, 60. The linkage is dimensioned and configured to ensure ball clearance by the ball-engaging means 28, 30 in the collapsed position of the cross-piece 32 as well as ball engagement by the ball-engaging means in the extended, interlocking position of the cross-piece.

In accordance with this invention, the above described linkage is particularly designed to permit the cross-piece 32 to assume its interlocking position in a relaxed state whereby the adjustable clamp means 34, 36 may be utilized to then apply increased loading forces onto the ball-engaging means 28, 30 to significantly enhance the ball clamping forces without stressing or tensioning the linkage. In the preferred embodiment, the clamp means 34, 36 includes a pair of flat steel plates 62, 64 and adjustable fastener means. The fastener means extend through the plates 62, 64 in parallel relation to the cross-piece 32 in its interlocking position for selectively applying increased clamping forces while it is in operative position. The plates 62, 64 will be understood to have fastener-receiving apertures, or slots 70, 72, of sufficient size to permit a discrete play without stressing the arms 20, 22, cross-piece 32 or cross-link 52 in response to the compressive force exerted by the plates 62, 64.

More specifically, the plates 62, 64 each include aligned openings for receiving the fastener means which, in the illustrated embodiment, are shown as a pair of round-headed bolts 66, 68 extending through slots 70, 72 in plates 64, 62 and secured by a washer 74 and nut 76 (FIG. 5) to be adjustably torqued to a desired clamping force loading. In the illustrated embodiment, bolts 66, 68 are shown on opposite sides of the ball-engaging means 28, 30 and in generally parallel relation to the cross-piece 32 in its interlocking position, it being understood that the slots 70, 72 in plates 62, 64 are dimensioned and configured to accommodate following movements of the clamp plates 62, 64 in response to the arms 20, 22 moving the ball-engaging means 28, 30 between released and operative positions without stressing the bolts which will be loosely attached to the plates during such movements. If desired, registering apertures such as at 78 and 80 may be provided in each plate for receiving an arm 82 of a conventional padlock 84, e.g., for securing the ball-engaging means 28, 30 in operative position.

To provide a significant clamping force in a simplified rack construction designed for low-cost production and reliable performance, this invention further provides for the ball-engaging means 28, 30 to be comprised of a pair of hollow steel cups 86, 88 removably mounted on the arms 20, 22 in confronting face-to-face relation with the rim 86A, 88A of each cup (FIG. 8) in beveled relation to its sidewall 86B, 88B, thereby providing enhanced annular surface-to-surface ball engagement. Each cup 86, 88 has a ball-shank cutout portion such as shown at 90 in FIGS. 5 and 8 which will be understood to be of a predetermined size to accommodate either a conventional ⅞ inch or 1 inch ball-shank 92.

To permit quick and easy modification of the basic rack 16 to fit either a Class I or Class II trailer-hitch, the rack is provided with modular pairs of cups with rims of different diametrical sizes for engaging the trailer-hitch balls of different diameters, typically, one pair of cups such as shown at 28B, 30B (FIG. 9) for 1 7/8 inch trailer-hitch balls and an additional pair of cups such as shown at 28A, 30A (FIG. 9) for use with a 2 inch ball. If required, a third pair of cups such as shown at 28, 30 (FIG. 9) for use with a Class III 2¼ inch ball may be provided, as well as other cup sets for balls of metric dimensioning.

In the illustrated embodiment, the cups are each removably mounted by a pair of conventional headed fasteners such as shown in FIG. 5 at 94 extending through each arm 20, 22 and plate 62, 64 and are secured by a nut 96 on an outer plate surface.

Figure 6:
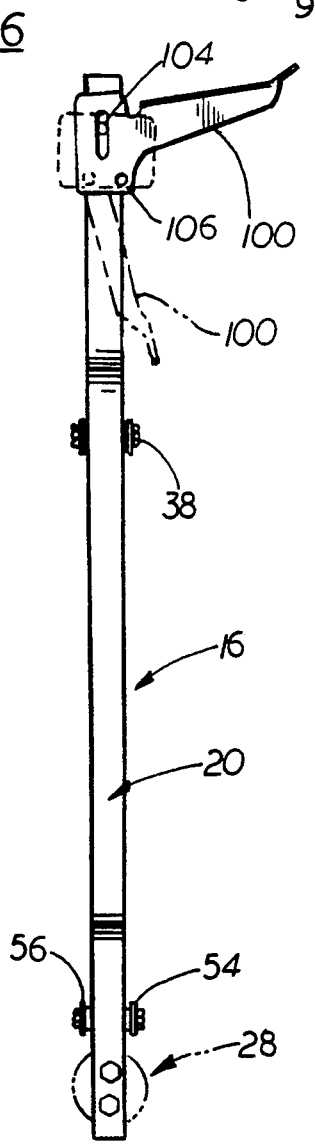
FIG. 6 is a side view of the rack.
Figure 7:
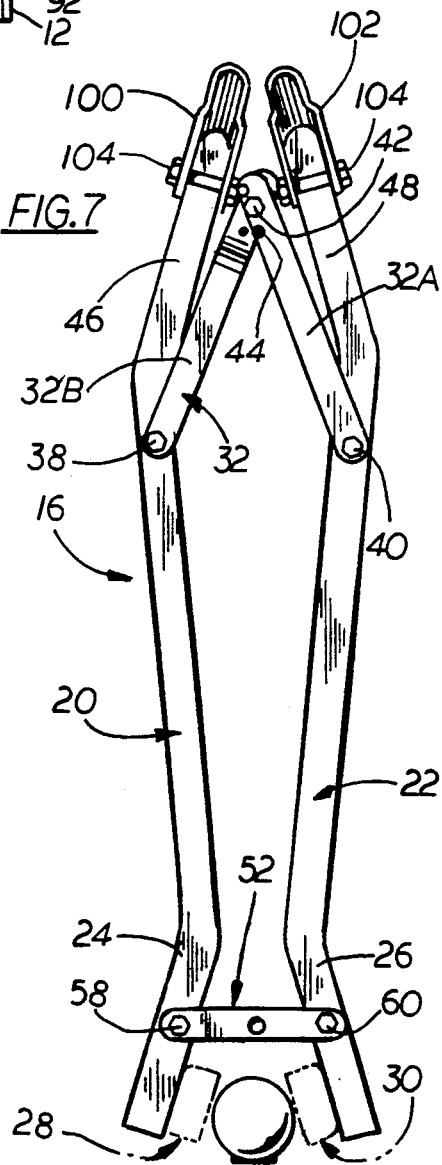
FIG. 7 is a front view of the rack with the cross-piece in collapsed position.

Accordingly, it will be seen that in use the rack 16 may be readily manipulated in a quick and easy manner to be moved into a collapsed position of the cross-piece 32 (FIG. 7), wherein the ball-engaging cups 86, 88 on opposite sides of the trailer-hitch ball 14 are sufficiently separated to ensure ball clearance, and into an interlocking position wherein the cross-piece 32 is in parallel relation to its underlying cross-link 52 with the ball-engaging cups 86, 88 located in adjacent relation to one another in contact with the trailer-hitch ball 14. Then with the cups in that operative position, the clamp plates 62, 64 are readily secured upon tightening the nuts 76 onto the fasteners 66, 68 of the clamp plates 62, 64 to thereupon selectively apply an adjustable locking force onto the ball-engaging cups 86, 88 to effect the desired compressive force. Carrier fingers 100, 102 at ends 46, 48 of the arms 20, 22 may then be moved about a pivot pin 104, 104 extending through each arm from a storage position (shown in broken lines in FIG. 6) wherein each of the fingers 100, 102 are in nested lapping relation to its respective arm 20, 22, to a transport position (shown in full lines in FIG. 6) for supporting an object such as bicycle 18 to be transported. In that transport position, each finger 100, 102 extends generally normal to its arm and is secured in that position by a suitable detent pin of hairspring cotter pin, not shown, within opening 106 of the finger and which serves as a stop in both transport and storage positions on opposite sides of its arm. Accordingly, the fingers 100, 102 on the upper ends of the rack 16 are readily pivoted about the fasteners 104, 104 to be selectively moved between the transport and storage positions. In the preferred embodiments, the outside dimensioning for the rack fingers is predetermined at about 16 inches for conventional-size bicycles as well as for children's and specialty bicycles; the fingers may be padded if desired with foam, tape or similar cushioning material, not shown.

When it is desired to disassemble the rack 16 from the trailer-hitch ball, all locking means, padlocks, etc., are initially removed from both the cross-piece 32 and the clamp plates 62, 64, the clamp plates then may be detached after loosening the clamping bolts 66, 68, and the cross-piece 32 is moved from interlocking to collapsed positions for convenient storage upon folding the fingers 100, 102 of each arm 20, 22 into storage position.

In summary, the described carrier rack 16 is not only readily manufactured at relatively low cost but is quick and easy to install as well as to remove, when desired. In use, the rack does not touch the vehicle body and yet will provide exceptionally rugged and reliable service over an extended period of time with minimal maintenance requirements. The rack of this invention is particularly suited for injury-free usage in view of the fact that there are no stress or tensioning forces created in the linkage by virtue of the disclosed design, for the cross-piece 32 itself in its interlocking position will be in a relaxed condition with the ball-engaging cups 86, 88 in operative position even when subjected to the increased adjustable compressive locking forces exerted by the clamp plates 62, 64. Accordingly, there is no danger of the cross-piece 32 snapping up toward collapsed position and injuring one upon releasing it from its operative position during disassembly.

As will be apparent to persons skilled in the art, various modifications, adaptations and variations of the foregoing specific disclosure can be made without departing from the teaching of this invention.

I claim:

1. A trailer-hitch ball mountable carrier rack comprising:

a pair of arms each having a first end and an opposite second end with ball-engaging means adapted to engage a trailer ball hitch on a vehicle, said ball-engaging means being supported on said first end of each arm;

a foldable cross-piece interconnecting the arms intermediate their ends, the cross-piece being articulated for movement between a collapsed position and an interlocking position;

the second ends of the arms being adjacent one another and the ball-engaging means on the first ends of the arms being remotely spaced apart in a released position when the cross-piece is in its collapsed position;

the second ends of the arms being remotely spaced apart and the ball-engaging means on the first ends of the arms being adjacent one another in an operative position when the cross-piece is in its interlocking position;

adjustable clamp means counted on said first ends of the arms, the clamp means including a pair of plates supported on said first ends of the arms, and adjustable fastener means cooperating with the plates for selectively applying an increased adjustable compressive locking force on the ball-engaging means in operative position and for releasing such clamping forces; and the cross-piece in its interlocking position being in a relaxed, unfolded and aligned condition when the ball-engaging means is in operative position and subjected to said compressive locking force by the clamp means.

2. The rack of claim 1 wherein the the cross-piece in its collapsed position is in a folded condition, and wherein the fastener means are disposed to extend through the plates in parallel relation to the cross-piece in its interlocking position.

3. The rack of claim 1, further including apertures in each plate for receiving a locking device for securing the ball-engaging means in operative position.

4. The rack of claim 1 wherein releasable locking means is provided for securing the cross-piece in interlocking position with the ball-engaging means in operative position and subjected to said compressive locking force by the clamp means.

5. The rack of claim 1 wherein the ball-engaging means comprises a hollow cup having a side wall and a ball-engageable rim in beveled relation to its sidewall for providing annular surface-to-surface ball-engagement.

6. The rack of claim 5 wherein the cup sidewall has a ball-shank receiving cut-out portion.

7. The rack of claim 1 wherein the ball-engaging means is removably mounted on the first end of its respective arm.

8. The rack of claim 7 wherein the ball-engaging means comprises a plurality of hollow cups having rims of different predetermined sizes for engagement with trailer-hitch balls of correspondingly different diameters.

9. The rack of claim 1 wherein said second end of each arm includes a finger thereon movable between a transport position, extending generally normal to the arm in releasably locked relation thereto, and a storage position in nested lapping relation to the arm.

10. The rack of claim 1 wherein the cross-piece comprises a pair of pivotally interconnected members having remotely disposed ends pivotally connected to the arms for moving the ball-engaging means between released and operative positions responsive to movement of the foldable cross-piece between said collapsed and interlocking positions.

11. The rack of claim 1 further including a cross-linking having a pin connection to each arm adjacent its said first end for cooperating with the cross-piece in establishing a predetermined range of movement of the ball-engaging means responsive to movement of the cross-piece between its collapsed and interlocking positions for ensuring ball clearance of the ball-engaging means in released positions and ball engagement of the ball-engaging means in operative position.

12. The rack of claim 11 wherein the arms are in mirror-image relationship, wherein said first and second ends of each arm are reversely offset in generally parallel relationship to one another, and wherein the cross-piece and cross-link are moved into parallel relationship upon moving the cross-piece into its interlocking position with the ball-engaging means of each arm in said operative position being in confronting aligned relationship to the ball-engaging means of the other arm.

* * * * *